(12) United States Patent
Ishii (10) Patent No.: US 7,361,934 B2
(45) Date of Patent: Apr. 22, 2008

(54) LIQUID CRYSTAL DISPLAY APPARATUS

(75) Inventor: Hiromitsu Ishii, Mitaka (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/448,631

(22) Filed: Jun. 7, 2006

(65) Prior Publication Data

US 2006/0278873 A1    Dec. 14, 2006

(30) Foreign Application Priority Data

Jun. 10, 2005    (JP)    ............... 2005-170349

(51) Int. Cl.
*H01L 29/04* (2006.01)
*H01L 29/15* (2006.01)
*H01L 31/036* (2006.01)

(52) U.S. Cl. .......................... 257/72; 257/59

(58) Field of Classification Search .......... 257/72, 257/59

See application file for complete search history.

(56) References Cited

U.S. PATENT DOCUMENTS 5,744,864 A    4/1998    Cillessen et al.
6,545,320 B2 *    4/2003    Ohtani et al. ............ 257/350
2004/0135940 A1    7/2004    Tsunekawa et al.
2004/0174483 A1    9/2004    Nakamura et al.

FOREIGN PATENT DOCUMENTS

JP    5-210112 A    8/1993
JP    2003-50405 A    2/2003

OTHER PUBLICATIONS

Notification Concerning Transmittal of Copy of International Search Report and Written Opinion of the International Searching Authority for PCT/JP2006/311687, 14 sheets.

* cited by examiner

*Primary Examiner*—Jerome Jackson
*Assistant Examiner*—Anthony Ho
(74) *Attorney, Agent, or Firm*—Frishauf, Holtz, Goodman & Chick, P.C.

(57) ABSTRACT

A thin film transistor is provided in a vicinity of a crossing region of scanning and the data lines on a first substrate. A pixel electrode is connected with the thin film transistor. A transparent electroconductive layer which is applied with a common potential is provided between the pixel electrodes and the scanning lines and data lines to cover the scanning and date lines, is superimposed on peripheral portions of the pixel electrodes on both sides. An insulating film is formed between the pixel electrodes and the electroconductive layer. An opposed electrode is formed on a second substrate to correspond to the pixel electrodes. A liquid crystal is provided between the pixel electrodes and opposed electrode.

20 Claims, 7 Drawing Sheets

LIQUID CRYSTAL DISPLAY APPARATUS

CROSS-REFERENCE TO RELATED APPLICATIONS

This application is based upon and claims the benefit of priority from prior Japanese Patent Application No. 2005-170349, filed Jun. 10, 2005, the entire contents of which are incorporated herein by reference.

BACKGROUND OF THE INVENTION

1. Field of the Invention

The present invention relates to a liquid crystal display apparatus.

2. Description of the Related Art

As a liquid crystal display apparatus, there is one having a configuration in which a liquid crystal is sealed between a thin film transistor substrate and an opposed substrate, each pixel electrode is provided to be connected with a scanning line and a data line through a thin film transistor as a switching element in a region surrounded by the scanning lines and the data lines provided in a matrix form on an inner surface side of the thin film transistor substrate, and a common electrode is provided on an inner surface side of the opposed substrate (see, e.g., Jpn. Pat. Appln. KOKAI Publication No. 2003-50405). The pixel electrode consists of a semiconductor material containing impurities, and is formed to be connected with the semiconductor thin film on the same layer as that of the semiconductor thin film of the thin film transistor.

In the conventional liquid crystal display apparatus, in order to suppress a pixel electrode voltage from being affected by a scanning signal and a data signal during driving, i.e., in order to reduce a parasitic capacitance generated between the pixel electrode and the scanning and data lines, a certain gap is provided between the pixel electrode and the scanning and data lines. Since the liquid crystal at a part corresponding to this gap is not controlled by the pixel electrode voltage, a display quality is lowered when this gap portion is visually confirmed. Thus, in general, this gap portion is assuredly covered with a black mask provided on the inner surface side of the opposed substrate. In this case, a displacement when attaching the thin film transistor substrate and the opposed substrate with each other must be also taken into consideration. As a result, there is a problem that dimensions of the black mask which covers a space between the pixel electrodes become larger than dimensions between the adjacent pixel electrodes to some extent and an opening ratio is thereby reduced.

BRIEF SUMMARY OF THE INVENTION

Therefore, it is an object of the present invention to provide a liquid crystal display apparatus which can increase an opening ratio.

According to one aspect of the present invention, there is provided a liquid crystal display apparatus comprising:

one and the other substrates;

a plurality of scanning lines which are formed on one surface side of the one substrate and extended in one direction;

a plurality of data lines which are formed on the one surface side of the one substrate and extended in a direction crossing the scanning lines;

a plurality of thin film transistors each of which is provided in the vicinity of each crossing region of the scanning lines and the data lines on the one surface side of the one substrate, the transistor including a semiconductor thin film, a gate electrode arranged on one surface side of the semiconductor thin film and source and drain electrodes respectively connected with source and drain regions of the semiconductor thin film;

a plurality of pixel electrodes each of which is connected with each of the thin film transistors;

a transparent electroconductive layer which is provided between the pixel electrodes and the scanning lines and data lines to cover drain lines, the electroconductive layer being disposed in a region including an interspace between the adjoined pixel electrodes and superimposed on at least parts of peripheral portions of the adjoined pixel electrodes, and applied with a common potential;

an insulating film formed between the pixel electrodes and the electroconductive layer;

at least one opposed electrode formed on a side of the other substrate to correspond to the pixel electrodes; and a liquid crystal provided between the pixel electrodes and opposed electrode.

According to the present invention, since a common potential is applied to the electroconductive layer through which light is transmitted to allow the liquid crystal in the region corresponding to a space between the pixel electrodes alone to assuredly perform black display, an opening ratio can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
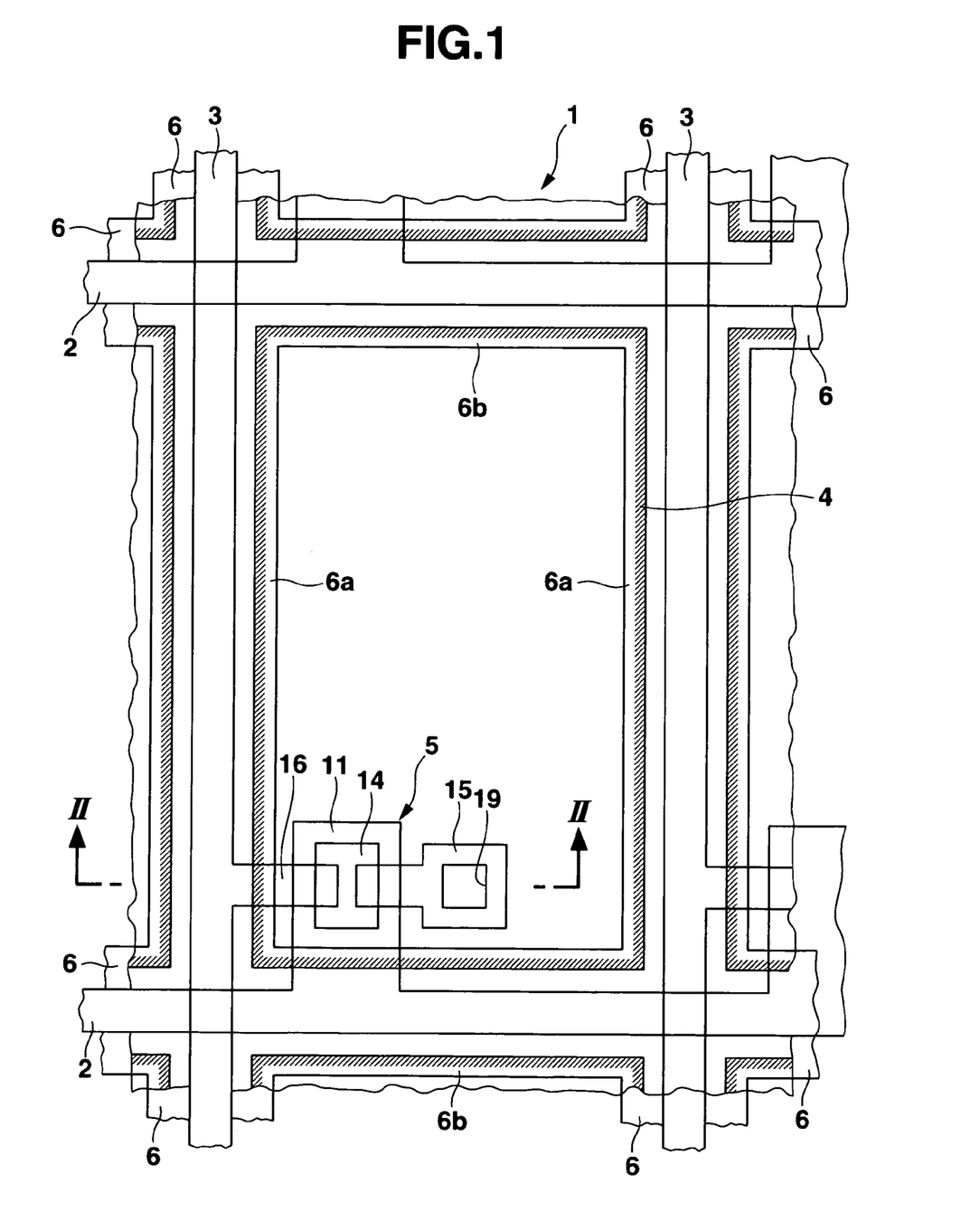
FIG. 1 is a perspective plan view showing a part of a thin film transistor substrate of a liquid crystal display apparatus as a first embodiment according to the present invention.
Figure 2:
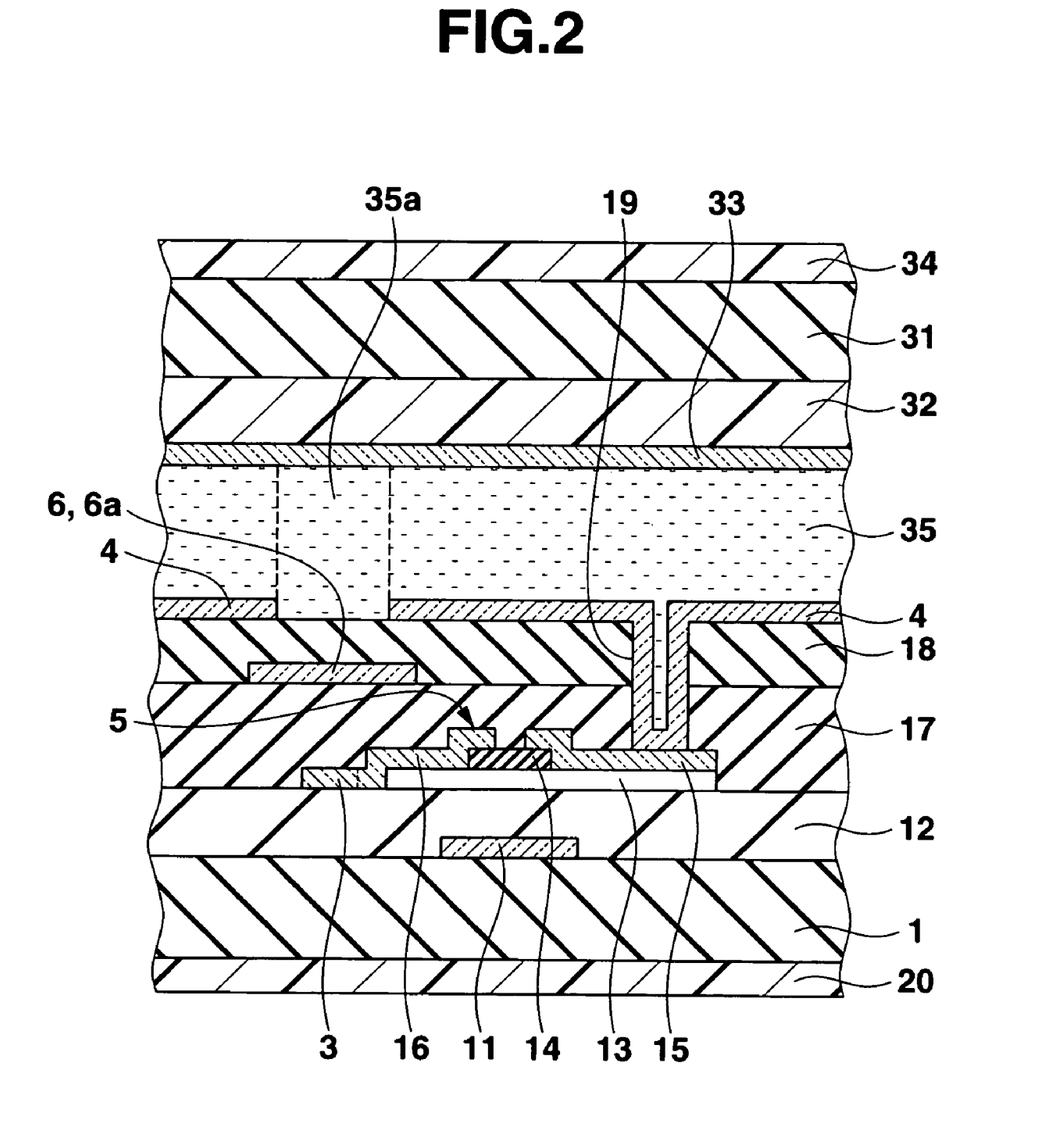
FIG. 2 is a cross-sectional view corresponding to a part taken along a line II-II in FIG. 1.

FIG. 1 shows a perspective plan view of a part of a thin film transistor substrate of a liquid crystal display apparatus as a first embodiment according to the present invention, and FIG. 2 shows a cross-sectional view corresponding to a part taken along a line II-II in FIG. 1. This liquid crystal display apparatus is provided with a thin film transistor substrate 1 and an opposed substrate 31 which are formed of a transparent glass substrate or the like.

The thin film transistor substrate 1 side or assembly will be first described with reference to FIG. 1. Scanning lines 2 and data lines 3 are provided in a matrix form on an upper surface side (an inner surface side facing the opposed substrate 31) of the thin film transistor substrate 1, a plurality of pixel electrodes 4 are provided each to be connected with the scanning line 2 and the data line 3 through a thin film transistor 5 in a region surrounded by both the lines 2 and 3, and a lattice-like auxiliary capacitance electrode (an electroconductive layer) 6 is provided in parallel with the scanning lines 2 and the data lines 3. Here, hatching using oblique short solid lines is provided in each rim portion on four sides of the pixel electrode 4.

In this case, in the square region surrounded by the scanning lines 2 and the data lines 3, the pixel electrode 4 likewise having a square shape is arranged to be practically close to the scanning lines 2 and the data lines 3. Each of rim portions on four sides of the pixel electrode 4 is superimposed on the lattice-like auxiliary capacitance electrode 6 arranged around each rim portion with a later-described insulating film 18 disposed therebetween. In FIG. 1, the thin film transistor 5 is arranged on a lower side of a left lower corner portion of the pixel electrode 4 and substantially entirely covered with the pixel electrode 4.

The lattice-like auxiliary capacitance electrode 6 is formed of an elongated first auxiliary capacitance electrode portion 6a which includes a part overlapping the data line 3 and extends in a column direction, and an elongated second auxiliary capacitance electrode portion 6b which includes a part overlapping the scanning line 2 and extends in a row direction. In this case, as will be described later, the auxiliary capacitance electrode 6 is provided on a layer different from the scanning line 2 and, especially, the first auxiliary capacitance electrode portion 6a is provided between the data line 3 and the pixel electrode 4 through insulating films 17 and 18 in a thickness direction, i.e., a direction vertical to a page space of FIG. 1.

A width of the first auxiliary capacitance electrode portion 6a is larger than a width of the data line 3 to some extent in such a manner that it slightly protrudes from both sides of the data line 3. As a result, even if there is a short displacement in a direction (a row direction) perpendicular to an extending direction (a column direction) of the data line 3, the first auxiliary capacitance electrode portion 6a absorbs a displacement amount to assuredly cover the data line 3 in such a manner that the data line 3 does not directly face the pixel electrode 4. Further, the first auxiliary capacitance electrode portion 6a is arranged over substantially the entire region where the data line 3 is arranged. As a result, even if there is a displacement with respect to the pixel electrode 4 in a direction parallel with the data line 3, the first auxiliary capacitance electrode portion 6a assuredly overlaps left and right side portions of the pixel electrode 4, thereby securely avoiding a fluctuation in an auxiliary capacitance due to the displacement in this direction.

A width of the second auxiliary capacitance electrode portion 6b is larger than a width of the scanning line 2 to some extent in such a manner that it slightly protrudes from both sides of the scanning line 2. As a result, even if there is a displacement in a direction (the column direction) perpendicular to the scanning line 2, the second auxiliary capacitance electrode portion 6b absorbs a displacement amount to assuredly cover the scanning line 2. Furthermore, the second auxiliary capacitance electrode portion 6b is arranged in substantially the entire region where the scanning line 2 is arranged. As a result, even if there is a displacement with respect to the pixel electrode 4 in a direction parallel with the scanning line 2, the second auxiliary capacitance electrode portion 6b assuredly overlaps upper and lower side portions of the pixel electrode 4, thereby securely avoiding a fluctuation in an auxiliary capacitance due to the displacement in this direction.

A concrete configuration of this liquid crystal display apparatus will now be described with reference to FIG. 2. A gate electrode 11 and the scanning line 2 (see FIG. 1) electrically connected with the gate electrode 11 are provided at a predetermined position on an upper surface of the thin film transistor substrate 1. In this case, each of the gate electrode 11 and the scanning line 2 is formed of a transparent metal oxide containing n-type or p-type impurities. As the transparent metal oxide, for example, zinc oxide, magnesium zinc oxide, cadmium zinc oxide or the like is preferable. As the n-type impurities, for example, phosphor, arsenic, stibium or the like is preferable. As the p-type impurities, for example, boron, aluminum, gallium, indium or the like is preferable.

As a method of forming the gate electrodes 11 and the scanning lines 2, there is recommended a method of forming a metal film by a sputtering technique targeting a metal oxide film containing the n-type or p-type impurities and patterning this film by using a photolithography technique. Since the n-type metal oxide film is of a depletion type and its leak current is large, it is preferable to use the p-type metal oxide film rather than the n-type metal oxide film to form the gate electrode 11 and the scanning line 2, but the present invention is not restricted thereto.

A gate insulating film 12 made of silicon nitride is provided on upper surfaces of the gate electrodes 11, the scanning lines 2 and the thin film transistor substrate 1. A semiconductor thin film 13 made of the same transparent genuine metal oxide having a band gap of 2.5V or above is provided on the upper surface of the gate insulating film 12 above the gate electrode 11. Since the semiconductor thin film 13 whose band gap is as wide as 2.5V or above does not absorb visible light, there is no light leak and light shielding is not required.

A channel protection film 14 made of silicon nitride is provided at a substantially central part on the upper surface of the semiconductor thin film 13. A source electrode 15, a drain electrode 16 and the data line 3 connected with the drain electrode 16 which are made of a transparent n-type metal oxide are provided on positions of both sides of an upper surface of the channel protection film 14, the upper surface of the semiconductor thin film 13 on both sides of the channel protection film 14 and the upper surface of the gate insulating film 12. Materials of the metal oxide and the n-type impurities are the same as the examples of the gate electrode 11 and the scanning line 2. The source electrodes 15, the drain electrodes 16 and the data lines 3 can be formed by the sputtering technique targeting the n-type metal oxide film and patterning this film by the photolithography technique, as used for the gate electrodes 11 and the scanning lines 2.

Here, the thin film transistor 5 having a bottom gate structure is constituted of the gate electrode 11, the gate insulating film 12, the semiconductor thin film 13, the channel protection film 14, the source electrode 15 and the drain electrode 16. In this case, since the gate electrode 11 is formed of the transparent p-type metal oxide or n-type metal oxide and each of the source electrode 15 and the drain electrode 16 is formed of the transparent n-type metal oxide, the thin film transistor 5 is configured to transmit light therethrough.

An interlayer insulating film 17 made of silicon nitride is provided on the upper surfaces of the thin film transistors 5, the data lines 3 and the gate insulating film 12. The auxiliary capacitance electrode 6 made of a transparent n-type metal oxide and having the above-described structure is provided at a predetermined position on an upper surface of the interlayer insulating film 17. Materials of this metal oxide and the n-type impurities are, e.g., the same as the examples of the gate electrode 11 and the scanning line 2. The auxiliary capacitance electrode 6 can be obtained by the method of forming the n-type metal oxide film by using the sputtering technique and patterning this film by using the photolithography technique, as used for the gate electrode 11 and the scanning line 2.

An overcoat film (an insulating film) 18 made of silicon nitride is provided on upper surfaces of the auxiliary capacitance electrode 6 and the interlayer insulating film 17. A contact hole 19 is formed in the overcoat film 18 and the interlayer insulating film 17 at a part corresponding to a predetermined position of the source electrode 15. The pixel electrode 4 made of a transparent metal oxide containing n-type or p-type impurities or a transparent electroconductive material such as ITO is provided on the upper surface of the overcoat film 18 at a predetermined position to be electrically connected with the source electrode 15 through the contact hole 19. In this case, the pixel electrode 4 is provided to substantially cover the entire thin film transistor 5. A polarizing plate 20 is provided on a lower surface of the thin film transistor substrate 1.

Color filters 32 formed of red, green and blue resins are provided on a lower surface of the opposed substrate 31 (an inner surface on the side facing the thin film transistor substrate 1). An opposed electrode 33 made of a transparent electroconductive material such as ITO is provided on a lower surface of the color filters 32. A polarizing plate 34 is provided on an upper surface of the opposed substrate 31. Moreover, the thin film transistor substrate 1 and the opposed substrate 31 are bonded with each other through a sealing material (not shown) at then peripheral portions, and a liquid crystal 35 is sealed between the substrates 1 and 31 on the inner side of the sealing material.

A description will now be given as to a display operation where this liquid crystal display apparatus is in a normal black mode which performs black display at the time of no electric field, the liquid crystal 35 is a TN (Twisted Nematic) liquid crystal having a twist angle of, e.g., 90° and both the polarizing plates 20 and 34 are arranged in such a manner that their transmission axes become parallel with each other.

First, when a voltage is not applied between the pixel electrode 4 and the common electrode 33, alignment of molecules of the liquid crystal 35 is twisted at 90°. Light from a backlight (not shown) arranged on the lower surface side of the thin film transistor substrate 1 is transmitted through the polarizing plate 20, the thin film transistor substrate 1, the pixel electrode 4 and others. Then, the light is transmitted through the liquid crystal 35 while being deflected at 90°, further transmitted through the common electrode 33, the color filter 32 and the common substrate 31 and blocked off by the polarizing plate 34, thereby effecting black display.

On the other hand, when a liquid crystal driving voltage which allows white display is applied between the pixel electrode 4 and the common electrode 33, an alignment direction of the molecules of the liquid crystal 35 becomes vertical to the pixel electrode 4 and the common electrode 33. Light from the backlight is transmitted through the polarizing plate 20, the thin film transistor substrate 1, pixel electrode 4 and others. Then, the light is transmitted through the liquid crystal 35 as it is and transmitted through the common electrode 33, the color filter 32, the common substrate 31 and the polarizing plate 34, thereby effecting white display.

Alternately, a description will now be given as to a display operation where this liquid crystal display apparatus is in a normal white mode which effects white display at the time of no electric field, the liquid crystal 35 is a TN liquid crystal having a twist angle of, e.g., 90° and both the polarizing plates 20 and 34 are arranged in such a manner that their transmission axes are perpendicular to each other.

First, when a voltage is not applied between the pixel electrode 4 and the common electrode 33, alignment of the molecules of the liquid crystal 35 is twisted at 90°. Light from the backlight is transmitted through the polarizing plate 20, the thin film transistor substrate 1, the pixel electrode 4 and others. The light is further transmitted through the liquid crystal 35 while being twisted or deflected at 90° and transmitted through the common electrode 33, the color filter 32, the common substrate 31 and the polarizing plate 34, thereby effecting white display.

On the other hand, when a voltage which effects black display is applied between the pixel electrode 4 and the common electrode 33, an alignment direction of the molecules of the liquid crystal 35 becomes vertical to the pixel electrode 4 and the common electrode 33. Light from the backlight is transmitted through the polarizing plate 20, the thin film transistor substrate 1, the pixel electrode 4 and others, the light is transmitted through the liquid crystal 35 as it is, further transmitted through the common electrode 33, the color filter 32 and the common substrate 31 and blocked off by the polarizing plate 34, thereby effecting black display.

In this liquid crystal display apparatus, a part 34a of the liquid crystal 35a positioned in a space between the adjacent pixel electrodes 4 is constantly set in a black display state. Here, the space between the pixel electrodes 4 is a region other than the pixel electrodes 4, and thus a gape between the longitudinal sides of the pixel electrodes 4 disposed on both sides of the data line 3 in a width direction, a gape between the lateral sides of the pixel electrodes 4 located on both sides of the scanning line 2 in the width direction and a gape between the pixel electrodes 4 arranged around each intersection of both the lines 2 and 3 in FIG. 1.

Where this liquid crystal display apparatus is in the normal black mode, a voltage applied to the auxiliary capacitance electrode 6 is controlled to have substantially the same potential as a voltage applied to the common electrode 33 (when a data signal voltage is applied to the common electrode 33, a voltage having the same phase and the same waveform is applied to the auxiliary capacitance electrode 6).

Then, a voltage is not constantly applied between the auxiliary capacitance electrode 6 and the common electrode 33 at the part corresponding to the space between the pixel electrodes 4, alignment of the molecules of the liquid crystal 35a is twisted at 90°. Light from the backlight is transmitted through the polarizing plate 20, the thin film transistor substrate 1, the scanning line 2, the data line 3, the auxiliary capacitance electrode 6 and others. The light is then transmitted through the liquid crystal 35a while being deflected at 90°, further transmitted through the common electrode 33, the color filter 32 and the common substrate 31 and blocked off by the polarizing plate 34. Thereby, the liquid crystal 35a at the part corresponding to the space between the pixel electrodes 4 is constantly set in the black display state.

As described above, in the liquid crystal display apparatus set in the normal black mode, in a non-display state, the liquid crystal 35a at the part corresponding to the space between the pixel electrodes 4 is constantly set in the constant black display state. Alternately, in a display state, the liquid crystal driving voltage is applied between the pixel electrode 4 and the common electrode 33, so that light from the backlight is transmitted through a space between the pixel electrode 4 and the common electrode 33 in accordance with the liquid crystal application voltage and further transmitted through the common electrode 33, the color filter 32, the common substrate 31 and the polarizing plate 34 to perform predetermined tone display. However, in this case, since both the auxiliary capacitance electrode 6 and the pixel electrode 4 are transparent, so that light is transmitted through an overlapping portion of these members, the overlapping portion of the auxiliary capacitance electrode 6 and the pixel electrode 4 contributes to an opening ratio.

Further, in the display state, the same potential is provided between the pixel electrode 4 and the common electrode 33, and hence the part corresponding to the space between the pixel electrodes 4 is in the light shielding state. Therefore, even though the auxiliary capacitance electrode 6 and the pixel electrode 4 are transparent, light leak does not occur. That is, in the display state, the space between the pixel electrodes 4 alone can be set in the light shielding state irrespective of a width of the auxiliary capacitance electrode 6.

Next, where this liquid crystal display apparatus is in a normal white mode, a voltage which is not smaller than the voltage effecting black display is controlled to be applied between the auxiliary capacitance electrode 6 and the common electrode 33. In this case, when the data signal voltage is applied to the common electrode 33, a voltage having a phase opposite to that of the data signal voltage is applied to the auxiliary capacitance electrode 6, or a data signal reference potential is set in such a manner that a voltage which is not smaller than the voltage effecting black display is applied even though a minimum amplitude is provided.

Then, the voltage which is not smaller than the voltage effecting black display is constantly applied between the auxiliary capacitance electrode 6 and the common electrode 33 at the part corresponding to the space between the pixel electrodes 4, an alignment direction of the molecules of the liquid crystal 35a becomes vertical to the auxiliary capacitance electrode 6 and the common electrode 33. Thus, the light transmitted from the backlight through the polarizing plate 20, the thin film transistor substrate 1, the scanning line 2, the data line 3, the auxiliary capacitance electrode 6 and others is transmitted through the liquid crystal part 35a in a non-deflected state. Then, the light is transmitted through the common electrode 33, the color filter 32 and the common substrate 31, and blocked off by the polarizing plate 34. Thereby, the liquid crystal 35a at the part corresponding to the space between the pixel electrodes 4 is constantly set in the black display state.

As described above, according to the liquid crystal display apparatus in the normal white mode, in the non-display state, the liquid crystal 35a at the part corresponding to the space between the pixel electrodes 4 is constantly set in the black display state. Further, in the display state, since the liquid crystal driving voltage is applied between the pixel electrode 4 and the common electrode 33. Thus, light from the backlight is transmitted through the space between the pixel electrode 4 and the common electrode 33 in accordance with the liquid crystal application voltage. The light is further transmitted through the common electrode 33, the color filter 32, the common substrate 31 and the polarizing plate 34 to perform predetermined tone display. However, in this case, since both the auxiliary capacitance electrode 6 and the pixel electrode 4 are transparent and thus, light is transmitted through the overlapping portion of these members, the overlapping portion of the auxiliary capacitance electrode 6 and the pixel electrode 4 contributes to the opening ratio.

Furthermore, even in the display state, since the voltage which is not lower than the voltage with which black display is performed is applied between the pixel electrode 4 and the common electrode 33, so that the part corresponding to the space between the pixel electrodes 4 is in the light shielding state, light leak does not occur even though the auxiliary capacitance electrode 6 and the pixel electrode 4 are transparent. That is, in the display state, the space between the pixel electrodes 4 alone can be set in the light shielding state irrespective of a width of the auxiliary capacitance electrode 6.

As described above, in this liquid display apparatus, the liquid crystal 35a at the part corresponding to the space between the pixel electrodes 4 is constantly set in the black display state in both the normal black mode and the normal white mode. Accordingly, light leak from the space between the pixel electrodes 4 can be assuredly avoided without using a black mask. In this case, the overlapping transparent portion of the auxiliary capacitance electrode 6 and the pixel electrode 4 which are configured to transmit light therethrough contributes to the opening ratio, thereby increasing the opening ratio.

Moreover, in this liquid crystal display apparatus, since the thin film transistor 5 is configured to transmit light therethrough and the pixel electrode 4 substantially covers the entire thin film transistor 5, the overlapping portion of the thin film transistor 5 and the pixel electrode 4 contributes to the opening ratio, and hence the opening ratio can be further increased. In this case, although light enters the semiconductor thin film 13 made of the transparent genuine metal oxide, the light is transmitted as it is, and hence there is no problem.

Additionally, in this liquid crystal display apparatus, since the first and second auxiliary capacitance electrode portions 6a and 6b having widths larger than those of the scanning line 2 and the data line 3 are provided between the side portions of the adjacent pixel electrodes 4 and the scanning and data lines 2 and 3, the first and second auxiliary capacitance electrode portions 6a and 6b can prevent a coupling capacitance from being generated between the pixel electrode 4 and the scanning and data lines 2 and 3, and occurrence of vertical crosstalk can be avoided, thus improving display characteristics.

Second Embodiment

Figure 3:
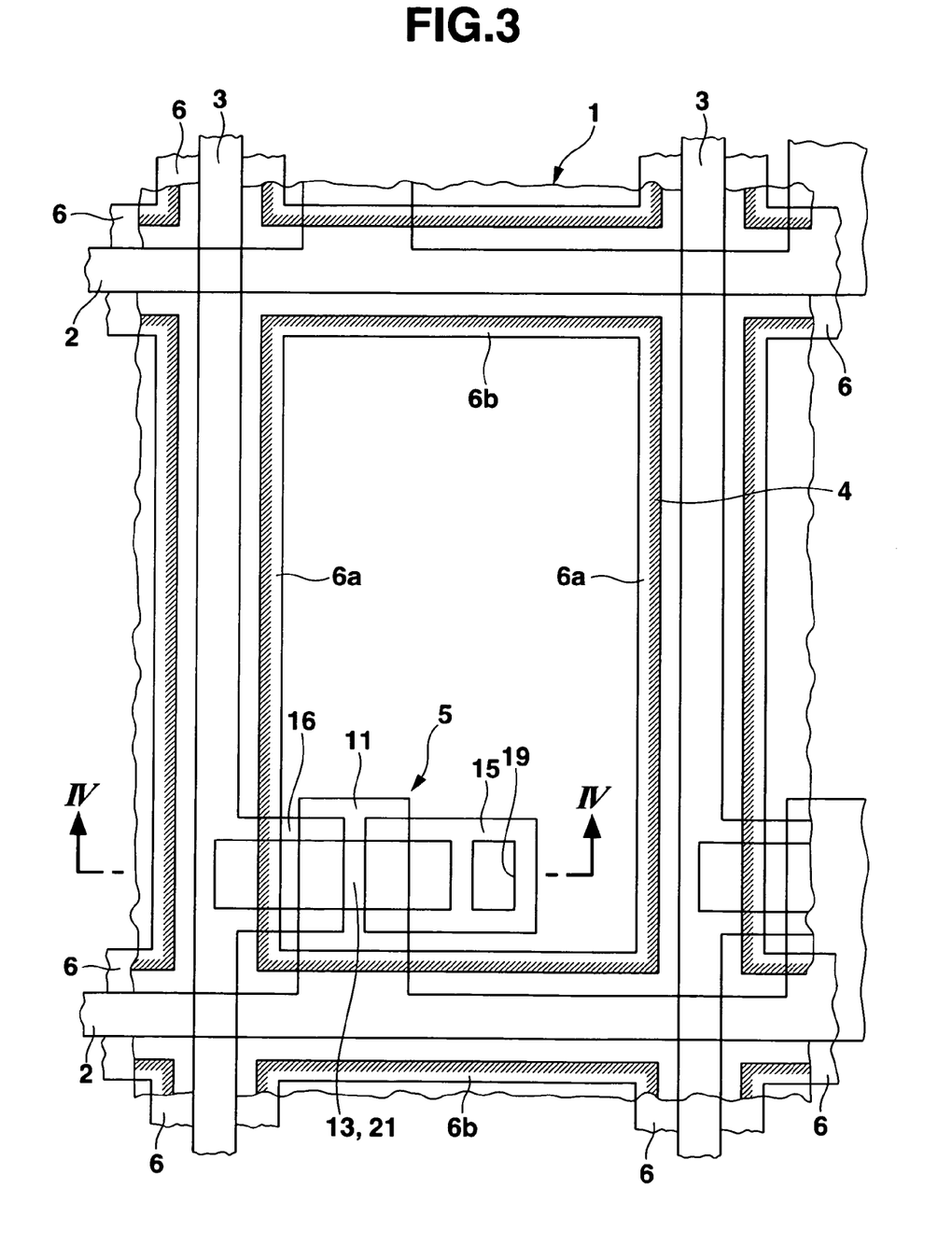
FIG. 3 is a perspective plan view showing a part of a thin film transistor substrate of a liquid crystal display apparatus as a second embodiment according to the present invention.
Figure 4:
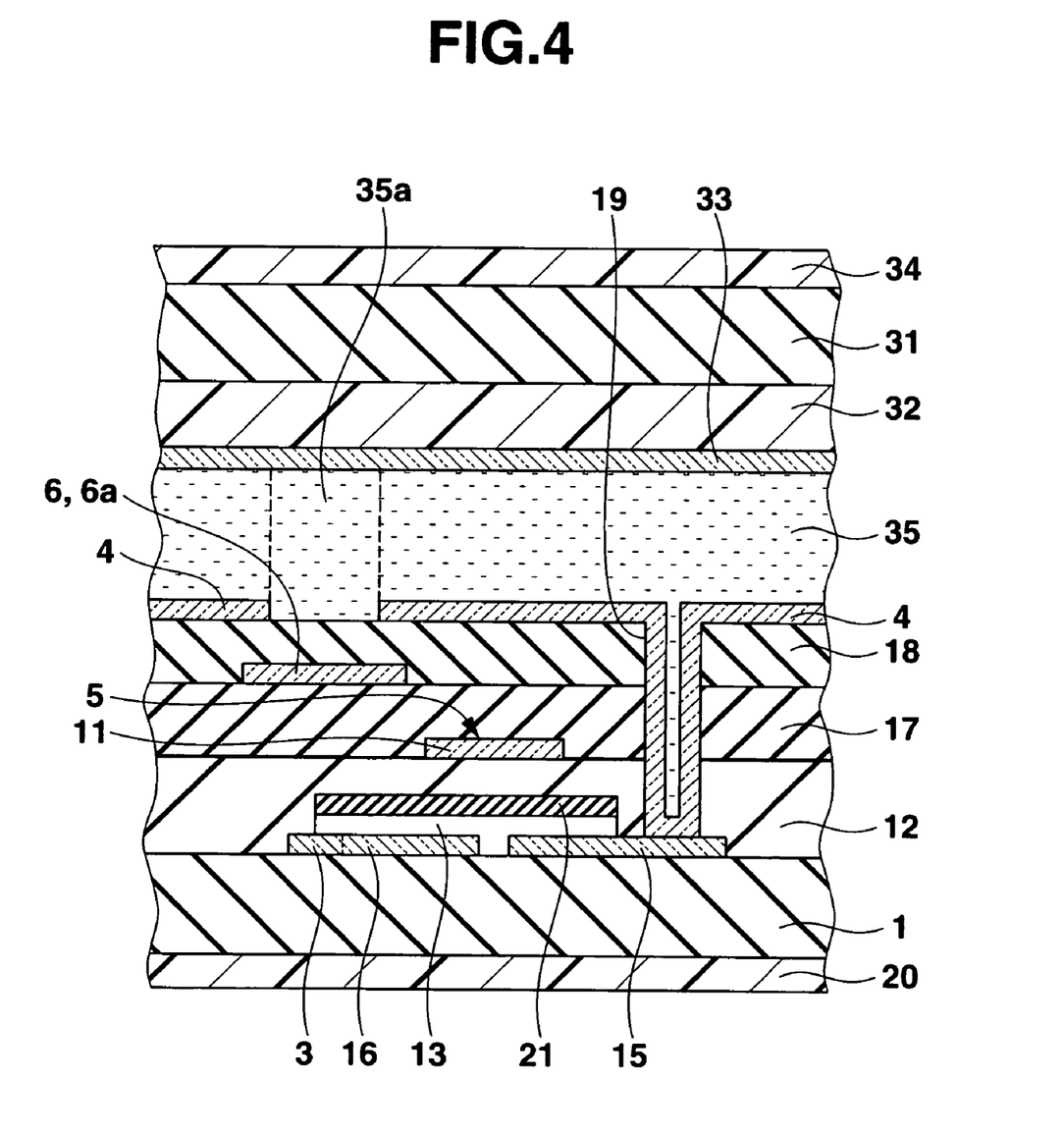
FIG. 4 is a cross-sectional view corresponding to a part taken along a line IV-IV in FIG. 3.

FIG. 3 is a perspective plan view showing a part of a thin film transistor substrate side in a liquid crystal display apparatus as a second embodiment of the present invention, and FIG. 4 is a cross-sectional view corresponding to a part taken along a line IV-IV in FIG. 3. In this case, hatching using oblique short solid lines is likewise provided at an edge portion of each pixel electrode 4 in order to clarify FIG. 3.

In this liquid crystal display apparatus, a remarkable difference from the liquid crystal display apparatus shown in FIGS. 1 and 2 lies in that a thin film transistor 5 has a top gate structure. Accordingly, in this liquid crystal display apparatus, like reference numerals denote parts having the same names as those in the liquid crystal display apparatus depicted in FIGS. 1 and 2.

In this liquid crystal display apparatus, a source electrode 15 and a drain electrode 16 made of a transparent electroconductive material such as ITO and a data line 3 connected with the drain electrode 16 are provided at each predetermined position on an upper surface of a thin film transistor substrate 1. A semiconductor thin film 13 made of the transparent genuine metal oxide is provided at a predetermined position on an upper surface of a source electrode 11, at a predetermined position on an upper surface of a drain electrode 12 and on the upper surface of the thin film transistor substrate 1 between these electrodes. A protection film 21 made of silicon nitride is provided on an entire upper surface of the semiconductor thin film 13.

As a method of forming the semiconductor thin films 13 and the protection films 21, a semiconductor thin film forming film made of a genuine metal oxide and a protection film forming film made of silicon nitride are first continuously formed on the upper surfaces of the thin film transistor substrate 1 the source electrodes 15, the drain electrodes 16 and the data lines 3 by a plasma CVD method. Then, a resist pattern is formed on an upper surface of the protection film forming film, and the protection film forming film is etched with this resist pattern being used as a mask, thereby forming the protection films 21.

Then, the resist pattern is separated by using a resist separation liquid. In this case, although the surface of the semiconductor thin film forming film in a region other than the lower side of the protection film 21 is exposed to the resist separation liquid, this exposed part is a region other than a device area, and hence there is no problem. That is, the semiconductor thin film forming film under the protection film 21 is protected by the protection film 21. Subsequently, when the semiconductor thin film forming film is etched with the protection films 21 being used as a mask, the semiconductor thin films 13 are formed below the protection films 21.

A gate insulating film 12 made of silicon nitride is provided on the upper surfaces of the thin film transistor substrate 1, the protection films 21, the data lines 3 and the source electrodes 15. Gate electrodes 11 made of a transparent p-type metal oxide or n-type metal oxide and scanning lines 2 connected with the gate electrode 11 are provided at a predetermined positions on an upper surface of the gate insulating film 12.

Here, the gate electrode 11, the gate insulating film 12, the semiconductor thin film 13, the protection film 21, the source electrode 15 and the drain electrode 16 constitute a thin film transistor 5 having a top gate structure. In this case, since the gate electrode 11 is formed of the transparent p-type metal oxide or n-type metal oxide and the source electrode 15 and the drain electrode 16 are formed of the transparent electroconductive material such as ITO, the thin film transistor 5 is configured to transmit light therethrough.

An interlayer insulating film 17 formed of silicon nitride is provided on the upper surface of the gate insulating film 12 the gate electrodes 11 and the scanning lines 2. An auxiliary capacitance electrode 6 made of a transparent n-type metal oxide is provided at a predetermined position on an upper surface of the interlayer insulating film 17. An overcoat film 18 formed of silicon nitride is provided on the upper surface of the interlayer insulating film 17 and the auxiliary capacitance electrode 6.

A contact hole 19 is provided in the overcoat film 18, the interlayer insulating film 17 and the gate insulating film 12 at a part corresponding to a predetermined position of the source electrode 15. A pixel electrode 4 formed of a transparent electroconductive material such as ITO is provided on an upper surface of the overcoat film 18 at a predetermined position to be electrically connected with the source electrode 15 through the contact hole 19. In this case, the pixel electrode 4 is provided to cover substantially the entire thin film transistor 5.

Further, in this liquid crystal display apparatus, like the first embodiment, since a liquid crystal 35a at a part corresponding to a space between the adjacent pixel electrodes 4 is constantly set in a black display state in both a normal black mode and a normal white mode, light leak from the space between the pixel electrodes 4 can be assuredly prevented without using a black mask, and an overlapping portion of the auxiliary capacitance electrode 6 and the pixel electrode 4 which are configured to transmit light therethrough contributes to an opening ratio, thereby increasing the opening ratio.

Furthermore, in this liquid crystal display apparatus, like the first embodiment, since the thin film transistor 5 is configured to transmit light therethrough and the pixel electrode 4 covers substantially the entire thin film transistor 5, the overlapping portion of the thin film transistor 5 and the pixel electrode 4 contributes to the opening ratio, thus further increasing the opening ratio.

Third Embodiment

Figure 5:
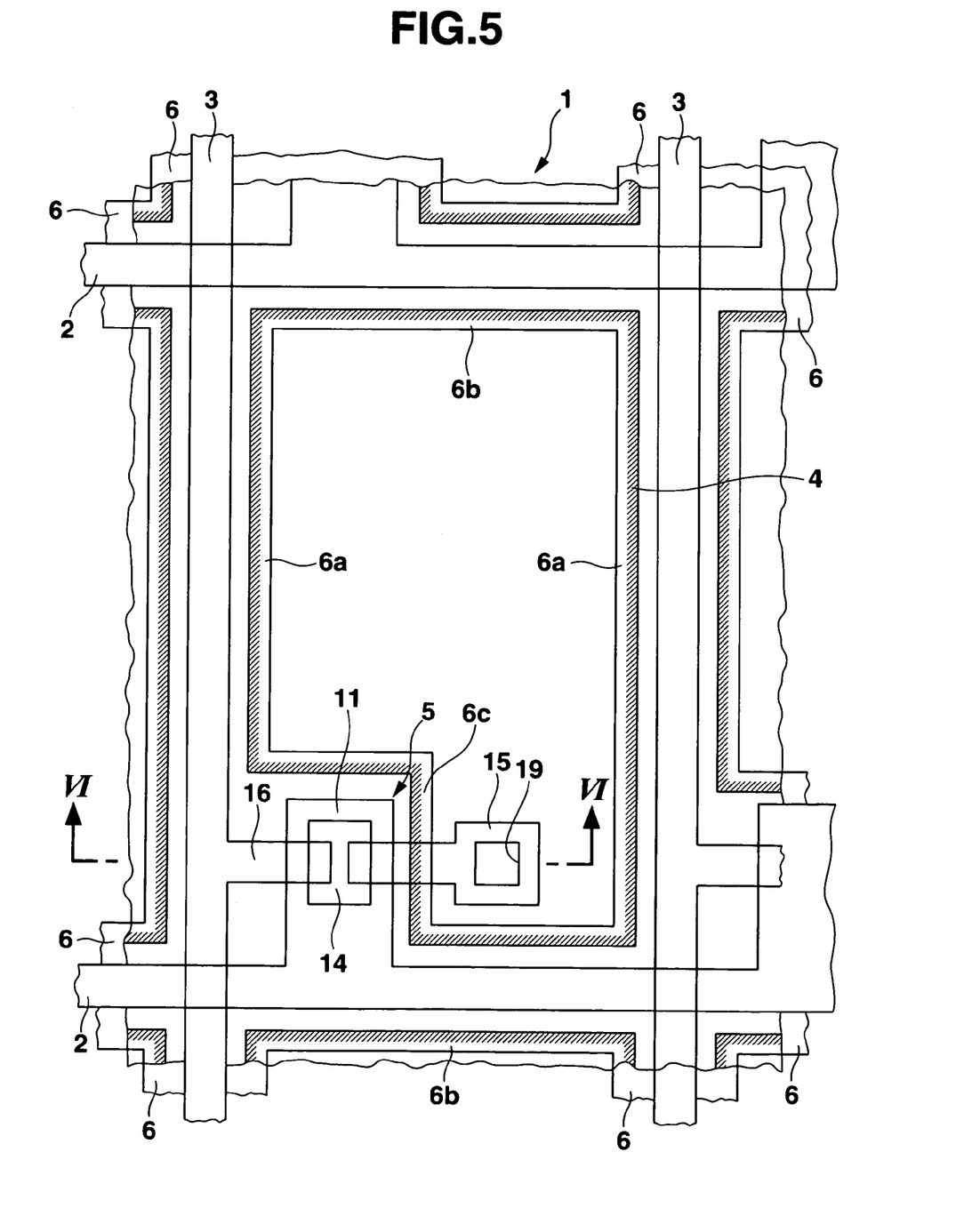
FIG. 5 is a perspective plan view showing a part of a thin film transistor substrate of a liquid crystal display apparatus as a third embodiment according to the present invention.
Figure 6:
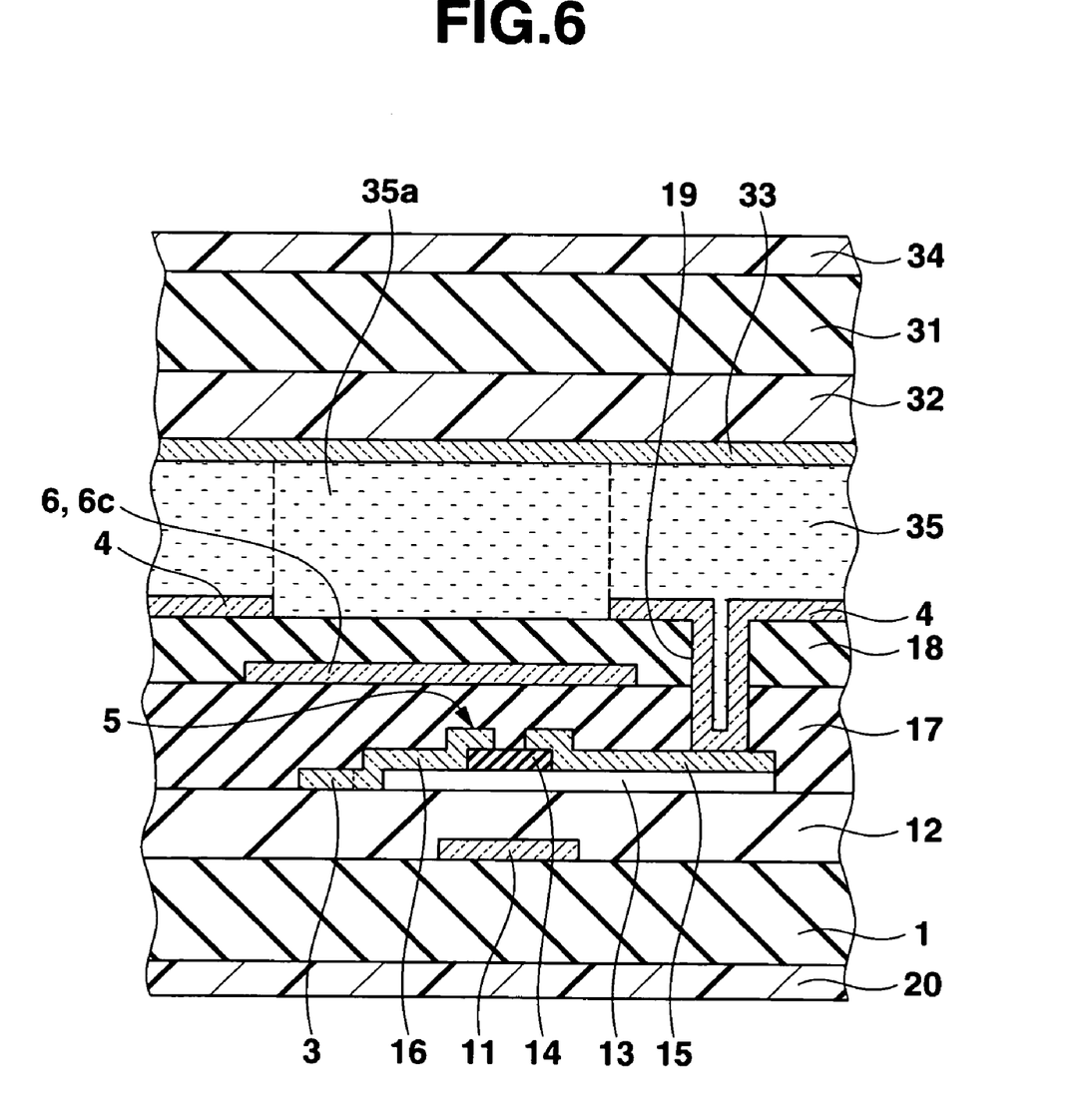
FIG. 6 is a cross-sectional view corresponding to a part taken along a line VI-VI in FIG. 5.

FIG. 5 is a perspective plan view of a part of a thin film transistor substrate side in a liquid crystal display apparatus as a third embodiment according to the present invention, and FIG. 6 is a cross-sectional view corresponding to a part taken along a line VI-VI in FIG. 5. In this case, hatching using oblique short solid lines is likewise provided at an edge portion of each pixel electrode 4 in order to clarify FIG. 5.

In this liquid crystal display apparatus, a difference from the liquid crystal display apparatus shown in FIGS. 1 and 2 lies in that a lower left corner portion of the pixel electrode 4 in FIG. 5, i.e., a part of a thin film transistor 5 corresponding to a gate electrode 11 has a notched part slightly larger than the gate electrode 11 and an auxiliary capacitance electrode 6 is thereby configured to have a third auxiliary capacitance electrode portion 6c including an overlapping portion of the thin film transistor 5 with respect to the gate electrode. Therefore, in this case, the entire circumferential portion of the pixel electrode 4 is likewise superimposed on the substantially-lattice-like auxiliary capacitance electrode 6 arranged around the pixel electrode 4.

Moreover, in this liquid crystal display apparatus, like the first embodiment, a liquid crystal 35a at a part corresponding to a space between the adjacent pixel electrodes 4 is constantly set in a black display state even though the auxiliary capacitance electrode 6 and the thin film transistor 5 are configured to transmit light therethrough. As a result, light leak from the space between the pixel electrodes 4 can be assuredly avoided without using a black mask, and the overlapping portion of the auxiliary capacitance electrode 6 and the pixel electrode 4 which are formed of the transparent electroconductive material contributes to an opening ratio, thereby increasing the opening ratio.

Other Modifications

Figure 7:
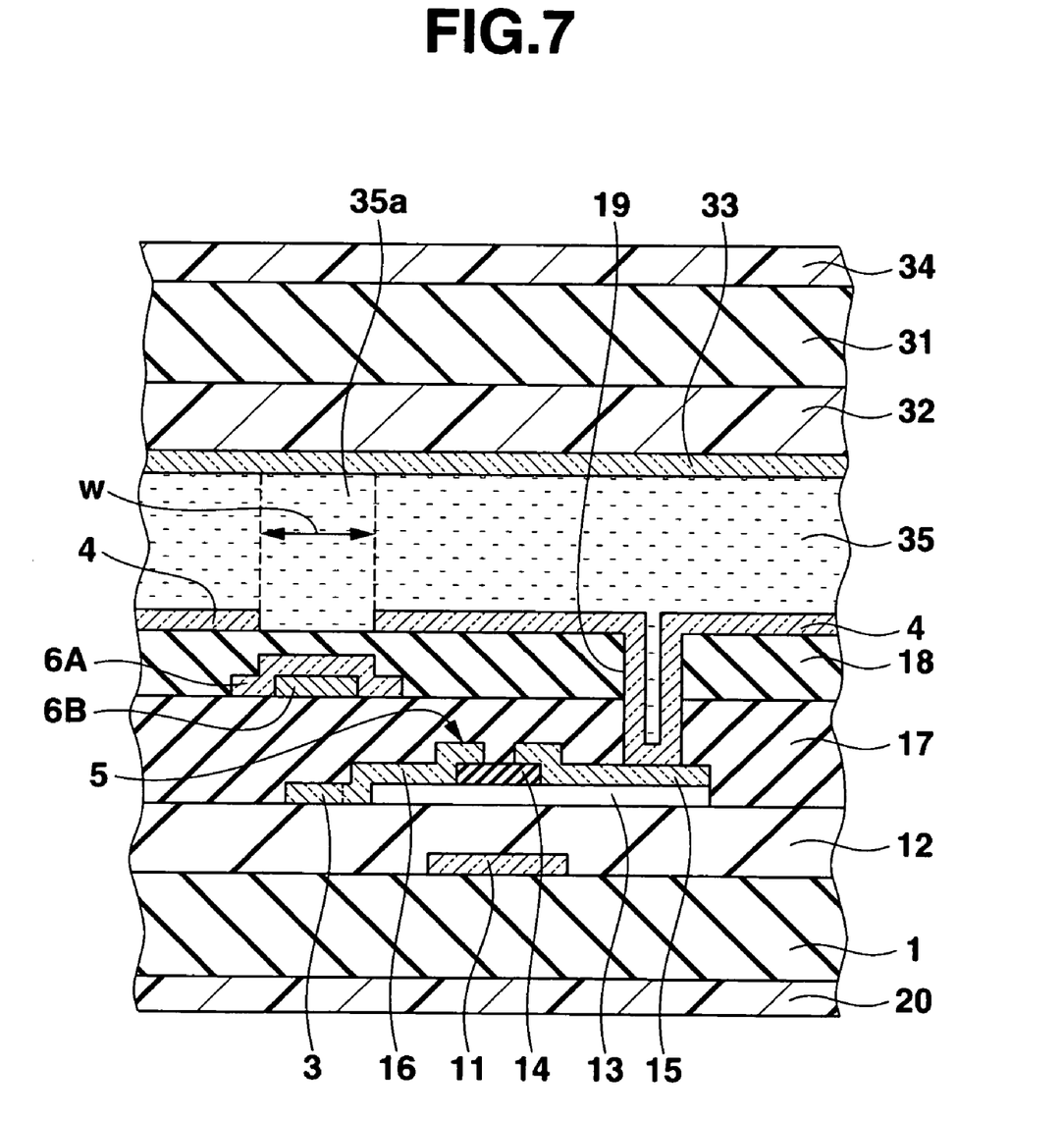
FIG. 7 is a cross-sectional view showing a modification of the first embodiment.

In each of the foregoing embodiments, the entire auxiliary capacitance electrode 6 is formed of the transparent metal oxide. As generally known, since the transparent metal oxide has a high resistance value, a potential difference is generated between a starting end side and a terminating end side of a line, thus producing irregularities in display. Therefore, when the auxiliary capacitance electrode 6 has a configuration in which a light-shielding type metal film formed of, e.g., aluminum or chrome and a transparent metal oxide are superimposed, display irregularities due to a potential difference between the starting end side and the terminating end side of the line. FIG. 7 is a cross-sectional view showing a modification in which such a countermeasure is taken with respect to the first embodiment depicted in FIG. 1. In FIG. 7, a difference from FIG. 1 lies in that an auxiliary capacitance electrode 6 formed on an interlayer insulating film 17 is constituted of a transparent metal film 6A covering a entire (upper and side surfaces of )light-shielding type metal film 6B. A width of the transparent metal film 6A is larger than a width of the light-shielding type metal film 6B and the transparent metal film 6A completely covers the light-shielding type metal film 6B. Both side edge portions of the transparent metal film 6A in a width direction overlap rim portions of pixel electrodes 4. However, the width of the light-shielding type metal film 6B is smaller than a gap w between the adjacent pixel electrodes 4, and both side edge portions of this film in the width direction do not overlap the rim portions of the pixel electrodes 4. It is desirable to set the width of the light-shielding type metal film 6B to a dimension with which both side end portions of the metal film 6B do not overlap the rim portions of the pixel electrodes 4 even if the pixel electrode 4 and the auxiliary capacitance 6 are displaced in the width direction of the auxiliary capacitance 6. However, if an opening ratio is sufficient, both side end portions of the light-shielding type metal film 6B may overlap at least one of the rim portions of the pixel electrodes 4 in some degree in order to further reduce a resistance value, although the present invention is not restricted to this configuration.

Furthermore, the order of superimposing the light-shielding type metal film 6B and the transparent metal film 6A may be reversed so that the light-shielding type metal film 6B may be formed on the upper surface of the transparent metal film 6A.

Although not shown, these configurations can be likewise applied to the second embodiment and the third embodiment shown in FIGS. 4 and 6.

Moreover, the present invention is not restricted to the structure in which the pixel electrode and the opposed electrode are formed on the different substrates, and it can be applied to a transverse electric field mode which is called In Plane Switching (IPS) where both the electrodes are provided on the same substrate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A liquid crystal display apparatus comprising:
    a first substrate;
    a second substrate opposing the first substrate;
    a plurality of scanning lines which are formed on a side of the first substrate and extend in one direction;
    a plurality of data lines which are formed on the side of the first substrate and extend in a direction crossing the scanning lines;
    a plurality of thin film transistors each of which is provided in a vicinity of a respective crossing region of the scanning lines and the data lines on the side of the first substrate, each transistor including a semiconductor thin film, a gate electrode arranged on a side of the semiconductor thin film and source and drain electrodes respectively connected with source and drain regions of the semiconductor thin film;
    a plurality of pixel electrodes each of which is connected with a respective one of the thin film transistors and which are arranged with a space between adjacent pixel electrodes;
    an electroconductive layer which is provided between the pixel electrodes and the scanning lines and the data lines to cover the data lines, the electroconductive layer being disposed in a region including the spaces between the adjacent pixel electrodes and superimposed on at least parts of peripheral portions of the pixel electrodes, and applied with a common potential;
    an insulating film formed between the pixel electrodes and the electroconductive layer;
    at least one opposed electrode formed on a side of the second substrate to correspond to the pixel electrodes; and
    a liquid crystal provided between the pixel electrodes and said at least one opposed electrode;
    wherein the electroconductive layer comprises a light-shielding, electroconductive film which has a width smaller than a width of the spaces between the adjacent pixel electrodes and a transparent electroconductive film which has a width larger than the width of light-shielding electroconductive film.

2. The liquid crystal display apparatus according to claim 1, wherein a potential with which a black display is observed is applied between the electroconductive layer and the opposed electrode.

3. The liquid crystal display apparatus according to claim 2, wherein the liquid crystal is a Twisted Nematic liquid crystal having a twist angle of 90°.

4. The liquid crystal display apparatus according to claim 1, wherein the electroconductive layer has a lattice-like shape and covers the scanning lines and the data lines.

5. The liquid crystal display apparatus according to claim 1, wherein each of the thin film transistors is configured to transmit light therethrough, and each of the pixel electrodes covers the respective thin film transistor.

6. The liquid crystal display apparatus according to claim 5, wherein the semiconductor thin film of the thin film transistor is formed of a metal oxide, and the drain and source electrodes and the gate electrode are formed of a metal oxide containing impurities.

7. The liquid crystal display apparatus according to claim 6, wherein the drain and source electrodes are provided on the semiconductor thin film.

8. The liquid crystal display apparatus according to claim 6, wherein the gate electrode of the thin film transistor is formed of a metal oxide containing p-type impurities.

9. The liquid crystal display apparatus according to claim 6, wherein the scanning line is electrically connected with the gate electrode, the scanning line is formed of the same material as that of the gate electrode, the data line is electrically connected with one of the drain and source electrodes, and the data line is formed of the same material as that of said one of the drain and source electrodes.

10. The liquid crystal display apparatus according to claim 5, wherein the semiconductor thin film of the thin film transistor is formed of a metal oxide, the gate electrode is formed of a metal oxide containing impurities, and the drain and source electrodes are formed of a transparent electroconductive material.

11. The liquid crystal display apparatus according to claim 10, wherein the drain and source electrodes are situated under the semiconductor thin film.

12. The liquid crystal display apparatus according to claim 1, wherein the electroconductive layer has a part which substantially covers an entire region of the thin film transistor.

13. The liquid crystal display apparatus of claim 1, wherein the transparent electroconductive film completely covers the entire light-shielding electroconductive film.

14. The liquid crystal display apparatus of claim 1, wherein the transparent electroconductive film covers upper and side surfaces of the light-shielding electroconductive film.

15. The liquid crystal display apparatus of claim 1, wherein the light-shielding electroconductive film is arranged relative to the pixel electrodes such that there is no overlap between the light-shielding electroconductive film and the pixel electrodes.

16. The liquid crystal display apparatus of claim 1, wherein both side edge portions of the transparent electroconductive film in a width direction are arranged to overlap portions of the pixel electrodes.

17. The liquid crystal display apparatus of claim 1, wherein the transparent electroconductive film is arranged on an upper surface of the light-shielding electroconductive film.

18. The liquid crystal display apparatus of claim 1, wherein the light-shielding electroconductive film and the transparent electroconductive film are laminated to each other.

19. The liquid crystal display apparatus of claim 1, wherein the light-shielding electroconductive film is formed on and in contact with the insulating film and the transparent electroconductive film is formed on and in contact with the light-shielding electroconductive film.

20. A liquid crystal display apparatus comprising:

a first substrate;

a second substrate opposing the first substrate;

a plurality of scanning lines which are formed on a side of the first substrate and extend in one direction;

a plurality of data lines which are formed on the side of the first substrate and extend in a direction crossing the scanning lines;

a plurality of thin film transistors each of which is arranged in a vicinity of a respective crossing region of the scanning lines and the data lines on the side of the first substrate, each of the transistors including a semiconductor thin film, a gate electrode arranged on a side of the semiconductor thin film and source and drain electrodes respectively connected with source and drain regions of the semiconductor thin film;

a plurality of pixel electrodes each of which is connected with a respective one of the thin film transistors and which are arranged with a space between adjacent pixel electrodes;

a transparent electroconductive layer arranged between the pixel electrodes and the scanning lines and the data lines to cover the data lines, the electroconductive layer being disposed in a region including the spaces between the adjacent pixel electrodes and superimposed on at least parts of peripheral portions of the adjacent pixel electrodes, and applied with a common potential;

an insulating film formed between the pixel electrodes and the electroconductive layer, at least one opposed electrode formed on a side of the second substrate to correspond to the pixel electrodes and applied with a common potential which is the same potential as the potential applied to the transparent electroconductive layer; and a liquid crystal arranged between the pixel electrodes and said at least one opposed electrode;

wherein the liquid crystal has a first part corresponding to the spaces between the pixel electrodes and a second part corresponding to peripheral portions of the pixel electrodes to which the transparent electroconductive layer is superimposed, and wherein only the first part of the liquid crystal is fully and constantly set in a black display state.

* * * * *